(12) United States Patent  (10) Patent No.: US 7,412,960 B2
Nishizawa  (45) Date of Patent: Aug. 19, 2008

(54) ENGINE (75) Inventor: Kazuya Nishizawa, Shizuoka-ken (JP)

(73) Assignee: Yamaha Motor Co., Ltd., Shizuoka (JP)

( * ) Notice: Subject to any disclaimer, the term of this patent is extended or adjusted under 35 U.S.C. 154(b) by 287 days.

(21) Appl. No.: 11/172,772

(22) Filed: Jul. 1, 2005

(65) Prior Publication Data

US 2006/0005801 A1  Jan. 12, 2006

(30) Foreign Application Priority Data

Jul. 5, 2004 (JP) ............... 2004-198540

(51) Int. Cl.
F02B 77/00 (2006.01)
(52) U.S. Cl. ............... 123/198 E; 180/219; 123/184.57
(58) Field of Classification Search ............ 123/184.57, 123/198 E; 181/229; 180/219
See application file for complete search history.

(56) References Cited

U.S. PATENT DOCUMENTS 6,155,224 A * 12/2000 Akihisa et al. ......... 123/184.57
6,314,931 B1  11/2001 Yasuda et al.
2006/0006016 A1 * 1/2006 Nishizawa ............... 180/219

FOREIGN PATENT DOCUMENTS

| JP | 08-031991 | 12/1996 |
|---|---|---|
| JP | 08-319911 | 12/1996 |
| JP | 10-095378 | 4/1998 |
| JP | 2002-048021 | 2/2002 |
| JP | 2002-160686 | 6/2002 |
| JP | 2003042023 | 2/2003 |

OTHER PUBLICATIONS

European Search Report dated Sep. 21, 2005. European Patent Application No. EP 05014554.

* cited by examiner

Primary Examiner—Stephen K. Cronin
Assistant Examiner—Katrina B. Harris
(74) Attorney, Agent, or Firm—Knobbe, Martens, Olson & Bear, LLP (57) ABSTRACT An engine can include an air cleaner in communication with intake ports of the engine, and a wind introduction duct for introducing a wind into a primary chamber of the air cleaner. The wind introduction duct can include a resonator for absorbing predetermined frequencies. The resonator can have a predetermined capacity and can have a communication port in communication with the inside of the introduction duct.

13 Claims, 5 Drawing Sheets

ENGINE

PRIORITY INFORMATION

This application is based on and claims priority to Japanese Patent Application No. 2004-198540 filed Jul. 5, 2004, the entire contents of which is hereby expressly incorporated by reference.

BACKGROUND OF THE INVENTION

1. Field of the Invention

The present inventions relate to motorcycles provided with an air cleaner in communication with an intake port of its engine, and a wind introduction duct for introducing wind into a primary chamber of the air cleaner.

2. Description of the Related Art

Some motorcycles are provided with an intake system in which an outlet port of a wind introduction duct (also known as a "scoop") is connected to a primary chamber of an air cleaner. In such designs, an inlet of the wind introduction duct is opened toward the front of the vehicle, such that the dynamic pressure of the wind created during forward movement of the motorcycle enhances the charging efficiency of intake air.

Associated with the installation of the wind introduction duct, a resonator may be provided for reducing intake noise of particular frequencies due to the intake air. In such a case, in general, a resonance chamber is externally attached to the wind introduction duct and the resonance chamber and the inside of the wind introduction duct are in communication with each other through a hole of predetermined dimensions. Such a design is disclosed in Japanese Patent No. JP-B-2841035.

SUMMARY OF THE INVENTION

An aspect of at least one of the embodiments disclosed herein includes the realization that in engines and/or vehicles that include a wind introduction duct, such as a duct having a forward-facing opening configured to guide wind into the engine, a resonator device can be included within the duct so as to provide noise suppression and position the resonator so that is does not adversely affect the outer appearance of the engine or vehicle.

Thus, in accordance with an embodiment, an engine can comprise an intake port, and an air cleaner in communication with the intake port. The air cleaner can have a primary chamber. The engine can also include a wind introduction duct for guiding a wind generated by forward movement of the engine into the primary chamber. The wind introduction duct can include a resonator configured to absorb predetermined frequencies, the resonator having a predetermined capacity and a communication port in communication with an inside of the introduction duct.

DETAILED DESCRIPTION OF THE PREFERRED EMBODIMENT

FIGS. 1 through 5 illustrate an intake system of an engine according to an embodiment. The present intake systems are illustrated and described in the context of a motorcycle because the inventions disclosed herein have particular utility in this context. However, the intake system can be used in other contexts, such as, for example, but without limitation, personal watercraft, outboard motors, inboard/outboard motors, and for engines of other land vehicles such as scooters, automobiles, etc.

In the drawings, reference numeral 1 designates a front body frame of a motorcycle. The front body frame 1 includes a head pipe 2 located at the front end of the vehicle body, a pair of left and right main frame members 3 which spread outward in a vehicle width direction while extending obliquely downward from the head pipe 2, and a pair of left and right under frames 4 extending obliquely downward from the front end of the lower surface of the main frame members 3 such that a spacing from the main frame members 3 becomes larger toward the rearward direction.

As used herein, the terms "front", "rear", "left" and "right" refer to directions relative to a rider seated on the seat of the motorcycle and facing toward a direction of forward travel of the motorcycle. However, these directional indications are not intended to limit the inventions disclosed herein to any particular direction or orientation. Rather, these directional references are merely used for convenience of description.

The left and right main frame members 3 can be formed of rectangular tubes. The frame members 3 can have the shape of a vertically longer rectangle, i.e. its height is larger than its width, as viewed in cross section.

A front fork 5 can be pivotally supported by the head pipe 2 so as to rotate leftward and rightward for steering. The front fork 5 can be made up of left and right fork bodies 5a, 5a coupled by upper and lower brackets.

A steering shaft can be provided between the upper and lower brackets and can be pivotally supported by the head pipe 2. A front wheel and steering handlebars (not shown) can be provided at a lower end and an upper end, respectively, of and between the left and right fork bodies 5a, 5a.

An engine 6 can be supported in suspension between the left and right main frame members 3 and under frames 4, and a rear body frame (not shown) of the vehicle. The engine 6 can be mounted such that its cylinder block, cylinder head, head cover, etc. are exposed to the outside among the main frame members 3, the under frame 4 and the rear body frame.

The engine 6 can be a V-type, 4-stroke, 4-cylinder engine with respective axes 7a, 7b of its front and rear cylinders forming a V-bank. Within the V-bank, left and right front intake ports 6a, 6a, in communication with the front cylinders, and left and right intake ports 6b, 6b, in communication with the rear cylinders, are open upward. However, this is merely one type of engine that can be used. Other types of engines can be used which operate on other types of combustion principles (e.g., diesel, rotary, two-stroke), have other cylinder configurations (in-line, W-type, horizontally opposed, etc.), and have other numbers of cylinders.

Front and rear throttle bodies 8, 8, can be disposed with their axes directed generally vertically and can be connected to upstream-end openings of the front and rear intake ports 6a, 6b, respectively. The throttle bodies 8 can each be provided with a throttle valve 8a for varying its passage area.

The front and rear throttle bodies 8 can each be provided with fuel injectors 10 for the respective cylinders. The fuel injectors 10 can be disposed such that their respective injection ports 10*a* are oriented toward the backside of an intake valve. The intake valves control the opening and closing of the intake ports 6*a*, 6*b* to the respective combustion chambers.

The engine 6 can also include an intake system 15. The intake system 15 can include an air cleaner assembly 16 in communication with the intake ports 6*a*, 6*b*, and a pair of left and right wind introduction ducts 17, 17 for guiding wind generated during operation into the air cleaner assembly 16.

Figure 1:
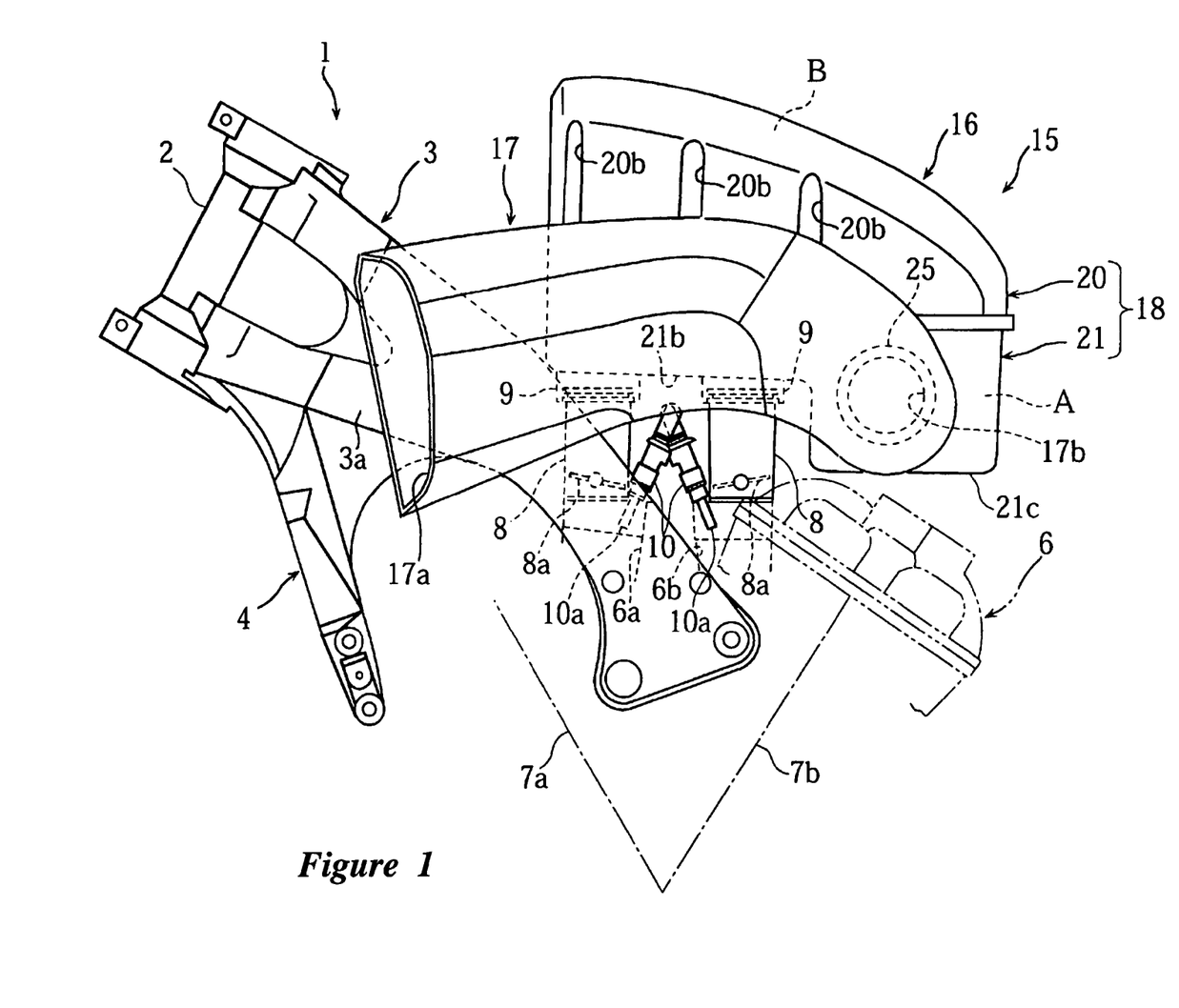
FIG. 1 is a side view of a front body frame member of a motorcycle and an intake system according to an embodiment.
Figure 2:
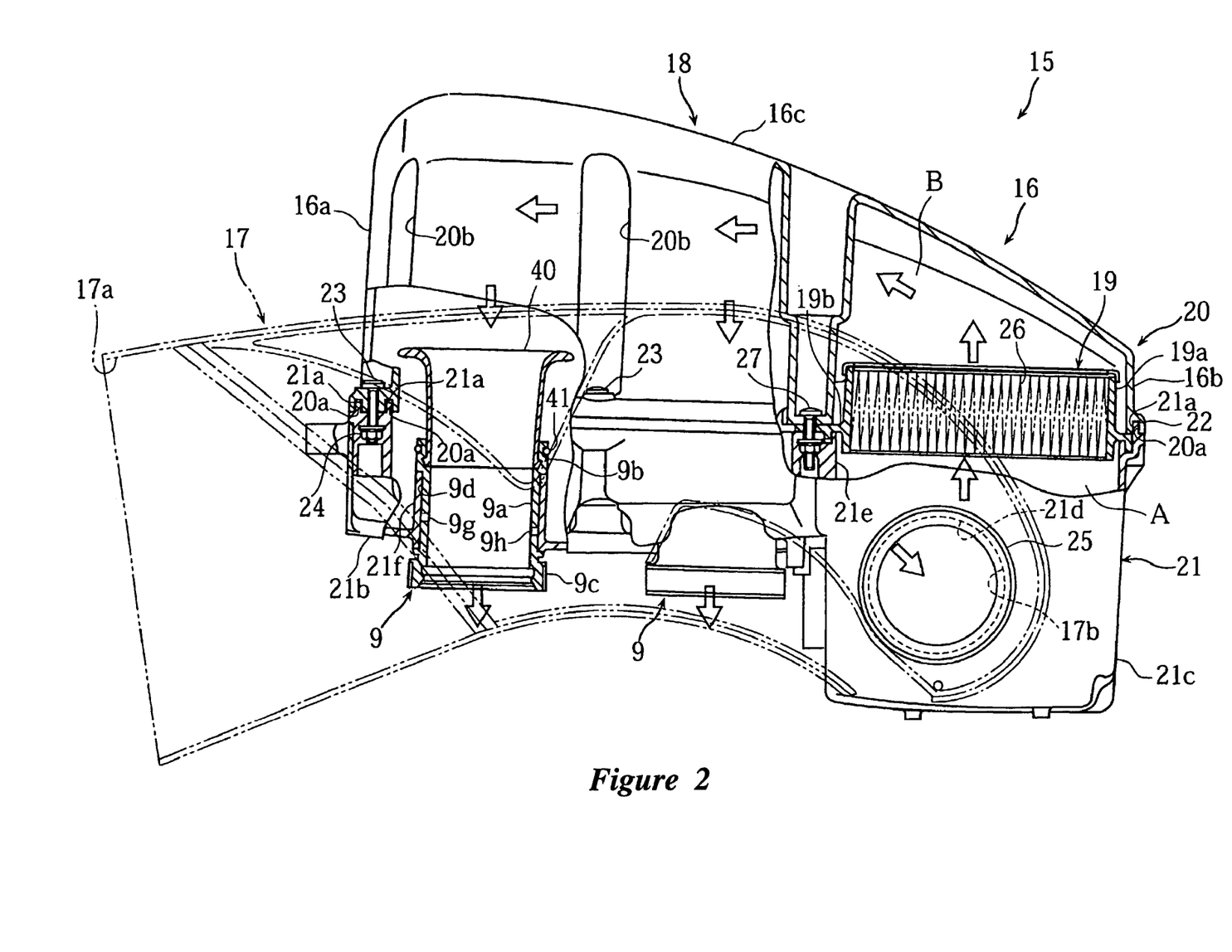
FIG. 2 is a partially sectional side view of an air cleaner chamber of the intake system.
Figure 3:
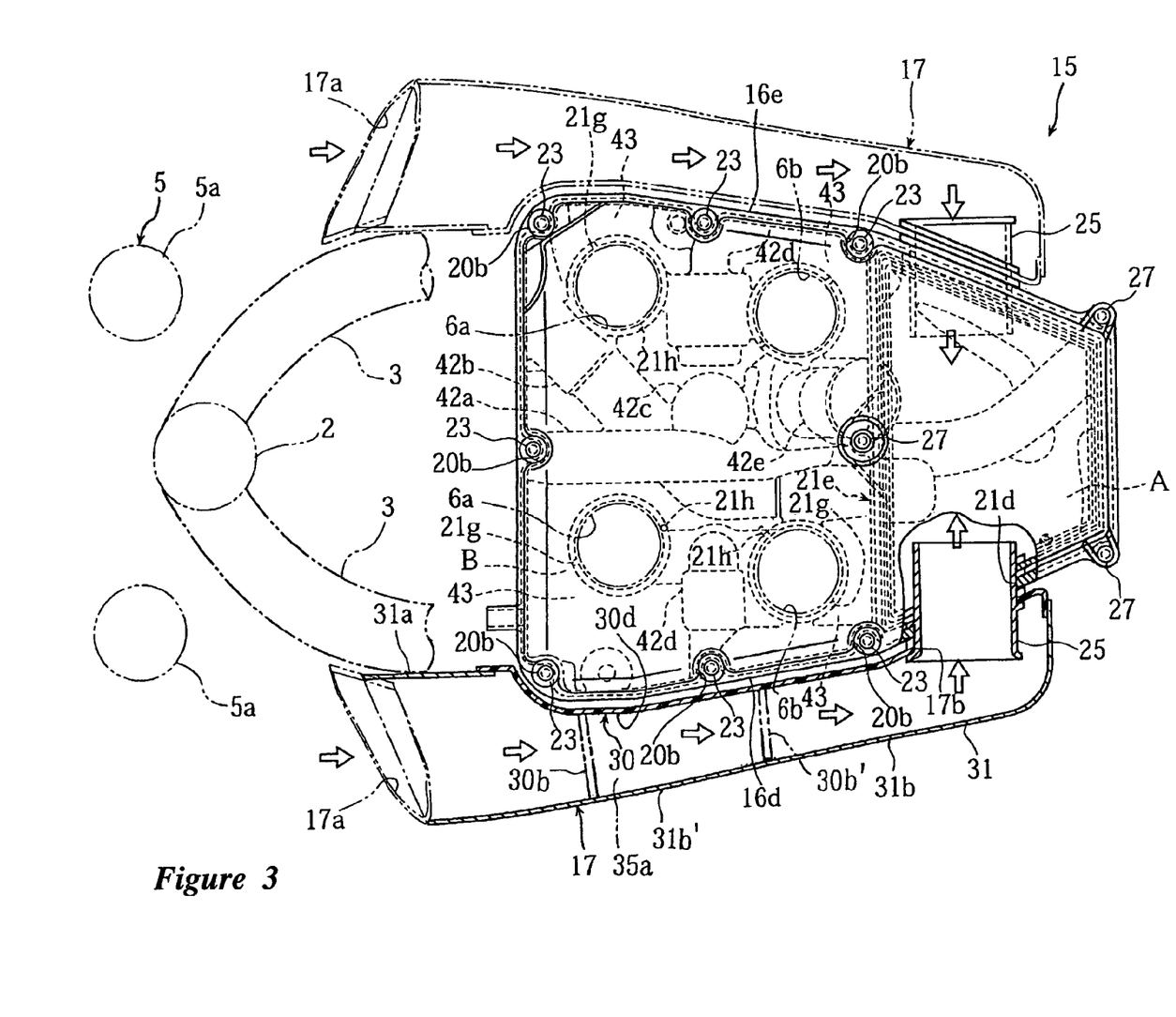
FIG. 3 is a top plan and partial sectional view of the intake system.

The air cleaner assembly 16 can be disposed over the V-bank of the engine 6 in such a manner as to cover upstream-end openings of the front and rear throttle bodies 8, 8. The air cleaner 16 has an appearance similar to that of a fuel tank. As viewed from a lateral side of the vehicle, a top wall 16*c* of the air cleaner 16 can be gently inclined obliquely downwardly from a front wall 16*a* side to a rear wall 16*b* side, as shown in FIG. 2. Also, as seen in top plan view, left and right side walls 16*d*, 16*e* of the air cleaner 16 are arranged to be spaced narrower in a vehicle width direction toward the rear, as shown in FIG. 3. The air cleaner 16 in its entirety can be generally trapezoid-shaped.

The left and right wind introduction ducts 17 extend in longitudinal directions of the vehicle along the left and right side walls 16*d*, 16*e* of the air cleaner 16. The left and right wind introduction ducts 17 can have a generally symmetrical structure, and thus only the left wind introduction duct 17 is further described below.

An outside air introduction port 17*a* of the wind introduction duct 17 can be located forward of the front intake port 6, and open forwardly, slightly downwardly (FIG. 1), and can taper outwardly (FIG. 3). The wind introduction duct 17 extends from the outside air introduction port 17*a* to a primary chamber A of the air cleaner assembly 16, which can be located rearward of the front and rear intake ports 6*a*, 6*b*. An outside air outlet port 17*b* formed at the rear end of the wind introduction duct 17 can be connected in communication with the primary chamber A of the air cleaner assembly 16.

With reference to FIG. 3, a front portion of the wind introduction duct 17 can be arranged in such a manner as to follow the shape of an outside wall surface 3*a* of the main frame members 3 of a vertically longer rectangle. That is, the outside air introduction port 17*a* can be arranged such that the outside wall surface 3*a* can be continued to a front inside wall surface 31*a* of the wind introduction duct 17. This allows the outside wall surface 3*a* to function as a guide to introduce wind into the outside air introduction port 17*a*.

Also, the wind introduction duct 17 can be arranged such that the outside air introduction port 17*a* can be located on an outer side of the fork body 5*a* of the front fork 5. This allows the outside air introduction port 17*a* to be open without being blocked by the fork body 5*a* as viewed from the front of the vehicle. The wind introduction duct 17 can also be disposed in such a manner as to cover front and rear joint members 9, 9 for the air cleaner 16 from an outer side in a vehicle width direction, as viewed from a lateral side of the vehicle.

As viewed from above the vehicle, the wind introduction duct 17 can be disposed obliquely in such a manner as to lie on an inner side in a vehicle width direction toward the rear of the vehicle. Also, as viewed from a lateral side of the vehicle, an upper edge of the wind introduction duct 17 extends generally linearly rearwardly from the outside air introduction port 17*a* and then curves more severely obliquely downwardly toward the outside air outlet port 17*b*, while its lower edge curves gently upwardly in a convex shape from the outside air introduction port 17*a* to the outside air outlet port 17*b*.

The air cleaner assembly 16 can include an air cleaner case 18 and an element 19 for dividing the inside of the air cleaner case 18 into the primary chamber A and a secondary chamber B. The air cleaner case 18 can be divided into an upper case 20 and a lower case 21.

The outer periphery of the divided surface of the upper case 20 can be formed with a concave groove 20*a* extending peripherally. The outer periphery of the divided surface of the lower case 21 can be formed with a convex portion 21*a* in engagement with the concave groove 20*a* through a seal ring 22.

With reference to FIG. 2, the upper case 20 and the lower case 21 can be coupled to each other in a detachable but airtight manner by plural bolts 23, inserted at predetermined intervals through the outer peripheral edge of the upper case 20, into nuts 24 placed by insert molding in the mating surface of the lower case 21. A clearance recess 20*b* opening upwardly can be formed in respective portions of the upper case 20 facing the bolts 23.

The lower case 21 can have a front bottom 21*b* and a rear bottom 21*c*. The rear bottom 21*c* can be shaped so as to extend downwardly below the front bottom 21*b*. A boundary between the front bottom 21*b* and the rear bottom 21*c* can be defined by a dividing wall 21*e*.

With reference to FIGS. 2 and 3, a wind inlet port 21*d* can be formed on left and right sides of the rear bottom 21*c*. The outside air outlet port 17*b* of the wind introduction duct 17 can be connected in communication with the wind inlet port 21*d* through a cylindrical communication member 25 in an airtight manner.

The element 19 can comprise a wet-type filter paper 26 placed and fixed in a case section 19*a* formed in the shape of such a square tube as to cover the divided surface in the rear bottom 21*c* of the lower case 21. A flange section 19*b* can be formed along the outside periphery of the case section 19*a* and integrally therewith.

The flange section 19*b* can be interposed between the divided surfaces of the upper case 20 and the lower case 21. The flange section 19*b* can be fixed to the lower case 21, together with the upper case 20, with its front center and rear left and right ends detachably fastened by three bolts 27. However, other fastening arrangements can also be used.

The element 19 can be disposed laterally over an upper opening of the rear bottom 21*c* of the lower case 21 such that the filter paper 26 can be generally horizontal. The element 19 blocks the upper opening of the rear bottom 21*c*.

The primary chamber A can be formed in a space surrounded by the element 19 and the rear bottom 21*c* below it. Also, the secondary chamber B can be formed in a space surrounded by the element 19, the upper case 20 above it, and the front bottom 21*b*. In the illustrated embodiment, more of the secondary chamber B can be disposed forwardly from the element 19, as compared to the primary chamber A.

The capacity of the secondary chamber B can be about 4-5 times that of the primary chamber A. IN an exemplary but non-limiting embodiment, for an engine of large displacement, such as over 1000 cc, for example, the capacities of the primary chamber A and the secondary chamber B can respectively be about 2.3 liters and about 10 liters.

Figure 4:
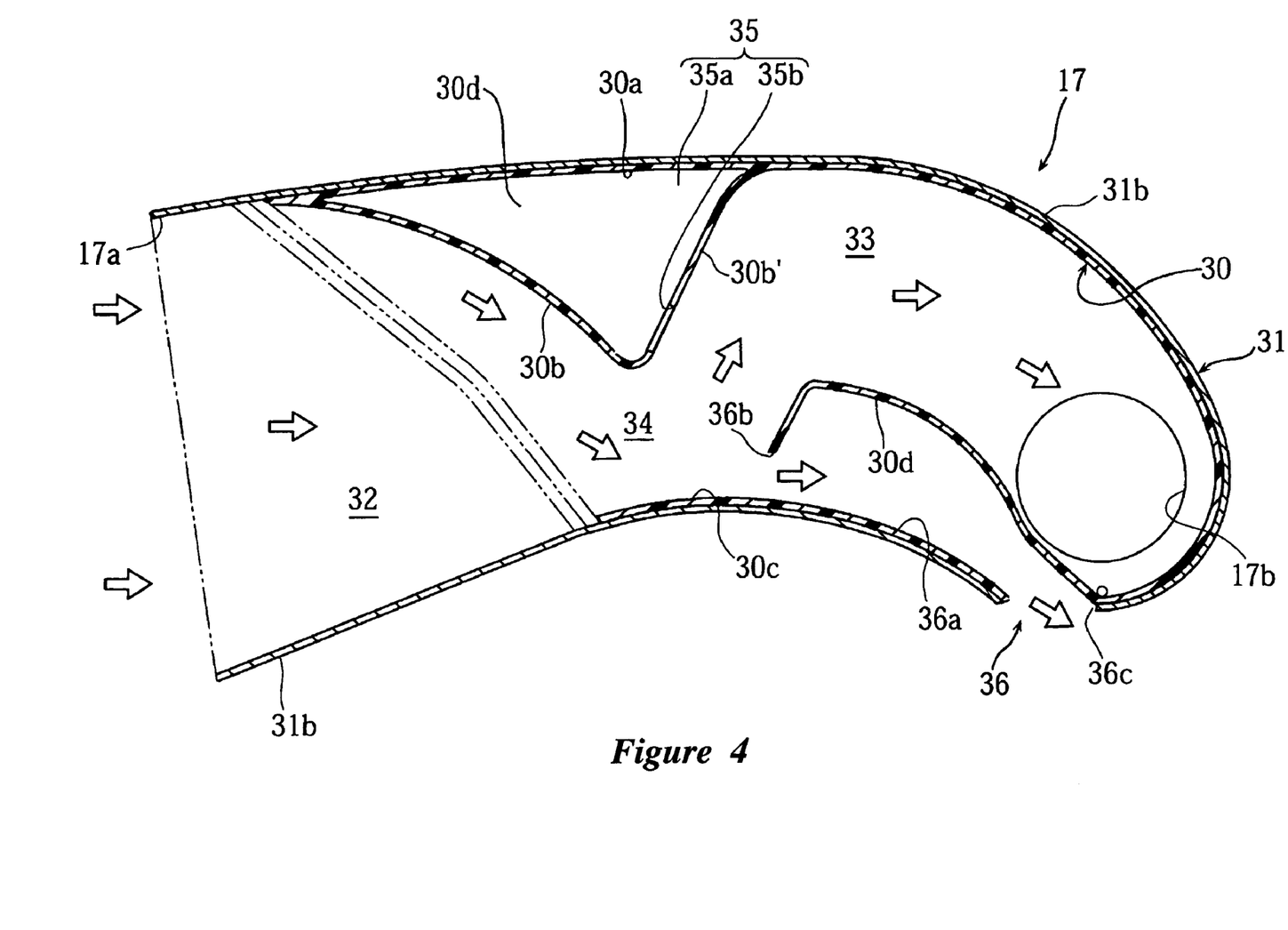
FIG. 4 is a sectional view of a wind introduction duct of the intake system.

With reference to FIG. 4, the wind introduction duct 17 can comprise a base member 30 made of resin, or another material, and can be located on an inner side in a vehicle width direction. A cover member 31 can made of an aluminum alloy, or another material, and can be secured to the base member 30 in such a manner as to cover it from an outer side in a vehicle width direction. A gloss finish, or other finishes, can be applied to the surface of the cover member 31 for improving the appearance.

The base member 30, formed with the outside air outlet port 17b, can be formed generally in the shape of a square U in cross section. The cover member 31 can comprise a front cylindrical portion 31a formed with the outside air introduction port 17a, and a body portion 31b generally formed in such a semi-elliptical shape in cross section as to surround the base member 30 from an outer side. The cover member 31 covers the base member 30 such that it cannot be seen from an outer side.

The wind introduction duct 17 can include a narrowing section 34 configured to increase the flow velocity of intake air, a resonator 35 configured to absorb intake noise of predetermined frequencies generated by the moving intake air, and a drain section 36 configured to drain water that may have entered the duct. The structure of these components is described below in greater detail.

As shown mainly in FIG. 4, the wind introduction duct 17 includes a front part 32 having the outside air introduction port 17a, and a rear part 33 with a passage area smaller than that of the front part 32. The narrowing section 34 for narrowing the passage area can be formed in a border area between the front part 32 and the rear part 33.

The narrowing section 34 can be formed by providing in the base member 30 on its top wall 30a side, a narrowing or "iris" wall 30b extending therefrom toward a bottom wall 30c side. That is, the narrowing section 34a can be formed in a space between a lower end of the iris wall 30b and the bottom wall 30c. The iris wall 30b reduces the passage area in the front part 32 gradually from the outside air introduction port 17a to the narrowing section 34.

The resonator 35 can comprise a resonance space 35a with a predetermined capacity that can be formed by an outer wall 30d, the top wall 30a of the base member 30, an outer wall 30b' of the cover member which constitutes an outside wall of the wind introduction duct 17, and the iris wall 30b as a dividing wall provided in the wind introduction duct 17 and in communication with the inside of the duct through a communication port 35b formed in the iris wall 30b on the rear part 33 side.

A partition wall 30d can be formed integrally with the rear part 33 of the base member 30. The partition wall 30d can extend generally in parallel with a rear portion 30b' of the iris wall 30b, and then bends downwardly to extend generally in parallel with the top wall 30a. The partition wall 30d allows the passage area in the rear part 34 to the outside air outlet port 17b to be approximately equal to that at the narrowing section 34.

The partition wall 30d and the bottom wall 30c can also form a branch passage 36a configured to form a drain, which is identified in FIG. 4 as a drain section 36. An upstream port 36b of the branch passage 36a can be opened toward the narrowing section 34 in the front part 32, and a downstream port opening 36c thereof can be opened toward the cylinder head of the rear cylinders 7b of the engine 6.

The narrowing section 34, the resonance space 35a, and the branch passage 36a can be formed by covering the base member 30 with the cover member 31. The communication member 25, which can constitute a connection portion between the base member 30 and the air cleaner assembly 16, is covered with the cover member 31, achieving a simple appearance.

Figure 5:
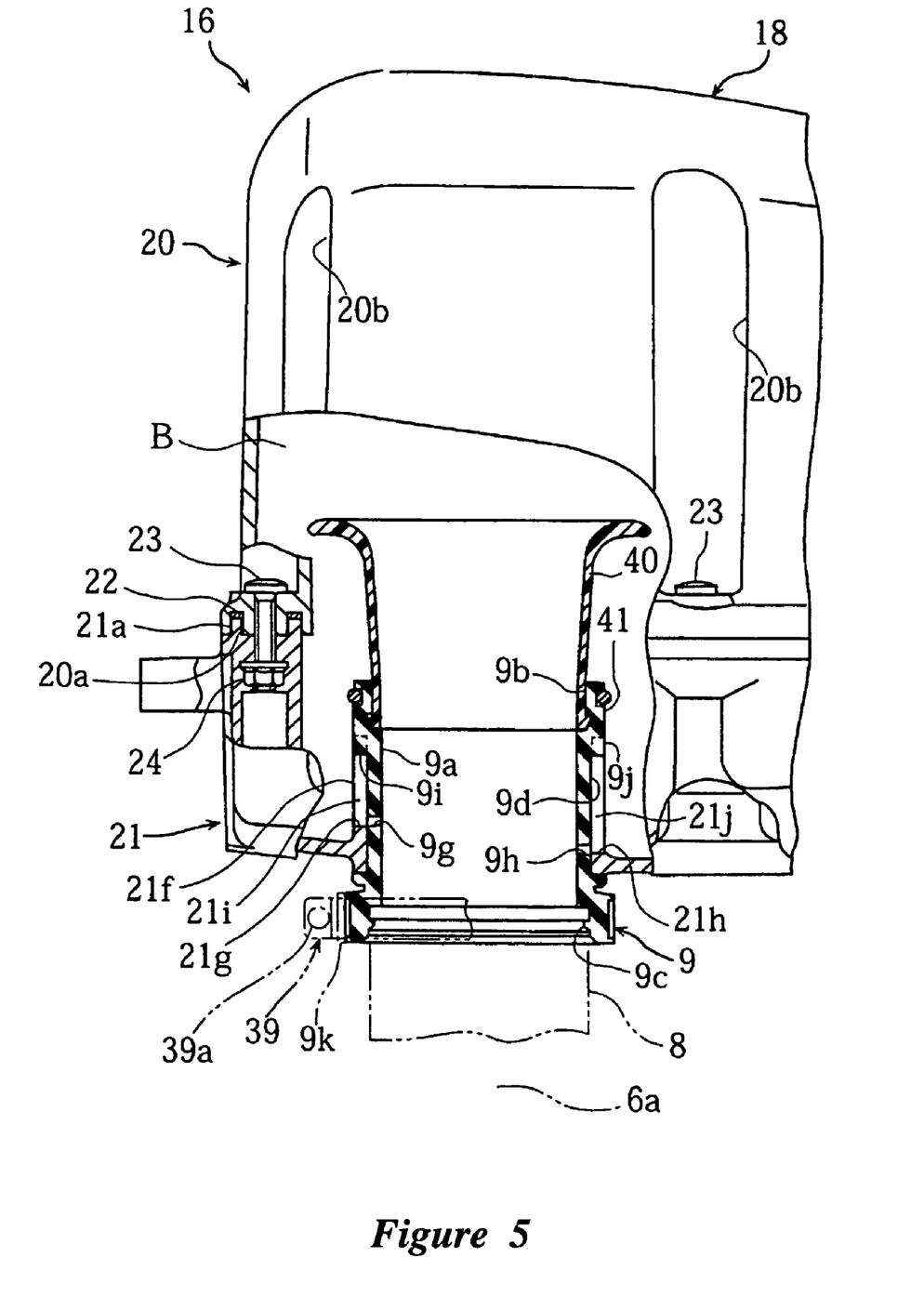
FIG. 5 is a sectional side view of a joint member for the air cleaner.

With reference to FIG. 5, the front bottom 21b of the lower case 21 forming the bottom of the secondary chamber B of the air cleaner 16 can be formed integrally with cylindrical bosses 21f corresponding to the front and rear intake ports 6a, 6b and extending in a vertical direction. The secondary chamber B of the air cleaner 16 can be connected in communication with the throttle bodies (engine side members) 8 through the joint members 9 respectively mounted and fitted in the bosses 21f.

The joint member 9 can be made of elastically deformable material, which can be rubber or other materials. The joint member 9 can comprise a cylindrical body 9a having an upper-end opening 9b and a lower-end opening 9c. A fitting recess 9d with a diameter smaller than that of the body 9a, can be formed on an outside circumference of the cylindrical body 9a.

The joint member 9 can be inserted into the boss 21f by deforming the joint member 9, then, in the deformed state, inserted into the boss 21f, and then the fitting recess 9d can be fitted with the boss 21f. This allows the joint member 9 to be fixed generally immovably in a vertical direction and abut against the inside circumferential surface of the boss 21f in a substantially airtight manner.

An intake pipe 40 opening vertically upward can be inserted and fitted into the upper-end opening 9b. The intake pipe 40 can be fastened and fixed by a spring band 41 mounted on the upper-end opening 9b. Also, the throttle body 8 can be inserted and fitted into the lower-end opening 9c. The throttle body 8 can be fastened and fixed by a fixing band 39 mounted on the lower-end opening 9c.

As shown in FIG. 3, the front bottom 21b of the lower case 21 can be formed with various interference avoidance sections 42a-42e that extend upwardly so as to avoid interference with other in-vehicle components. The interference avoidance sections 42a-42e are formed in regions around the bosses 21f, and include, for example, a harness installation portion 42a extending in a longitudinal direction in center in a vehicle width direction, a water pipe clearance portion 42b intersecting the harness installation portion 42a, an idle air adjusting step motor or solenoid clearance portion 42c formed at an intersection of the portions 42a, 42b, a pressure regulator clearance portion 42d formed between the front and rear bosses 21f, a throttle motor clearance portion 42e formed between the rear right intake port 6b and the harness installation portion 42a. Other clearance portions can also be provided.

The front bottom 21b of the lower case 21 can also be formed with plural recessed sections 43 extending generally downwardly with respect to the interference avoidance sections 42a-42e. The recessed sections 43 can be formed in regions where the interference avoidance sections 42a-42e are not formed, in such a manner as to contact the bosses 21f.

As shown in FIG. 5, the boss 21f and the joint member 9 can be formed with pairs of drain holes 9g, 21g and 9h, 21h, respectively, passing through in opposing radial directions around a central axis of the boss 21f. The secondary chamber B of the air cleaner assembly 16 and the intake ports 6a, 6b of the engine 6 are in communication with each other through the drain holes 9g, 21g and 9h, 21h.

The drain holes 9g, 21g on one side are located on an outer side, in a vehicle width direction, with respect to the boss 21f, and the drain holes 9h, 21h on the other side are located on an inner side in a vehicle width direction. The inner drain holes 9h, 21h are disposed with steps so as to be disposed to be lower than the outer drain holes 9g, 21g. The drain holes 9g, 21g and 9h, 21h are located in such a manner as to correspond to the recessed sections 43 which are, as noted above, recessed generally downwardly.

The boss 21f can be formed with slits 21i, 21j extending in continuation to the drain holes 21g, 21h to an upper end thereof. On the other hand, an upper-end portion of the fitting recess 9d surface of the joint member 9 can be formed with positioning projections 9i, 9j for engagement with the slits 21i, 21j. This allows the joint member 9 to be positioned at a predetermined angle and generally immovable in circumferential directions.

When the positioning projections 9i, 9j of the joint member 9 are in engagement with the slits 21i, 21j of the boss 21f, the drain holes 21g, 21h of the boss 21f correspond to the drain holes 9g, 9h of the joint member 9, respectively.

A band positioning section 9k for positioning the fixing band 39 at a predetermined circumferential angle can be formed to project at the lower-end opening 9c of the joint member 9. When the positioning projections 9i, 9j of the joint member 9 are in engagement with the slits 21i, 21j of the boss 21f, a fastening bolt 39a of the fixing band 39 can be directed to a prescribed direction for fastening. That is, the band positioning section 9k allows the fixing band 39 to be directed in a direction where a fastening jig can be inserted when assembling the air cleaner 16 to the engine 6.

As noted above, the left and right wind introduction ducts 17 extend from the outside air introduction port 17a located forward of the front intake port 6a, passing by the front and rear intake ports 6a, 6b, to the primary chamber A of the air cleaner 16 located rearwardly therefrom. This provides more length of the duct allowing more room for the narrowing section 34 which is used to increase the flow velocity of intake air, the drain section 36 which is used for draining water, and the resonator 35 which reduces noise.

In addition, the wind introduction duct 17 is disposed in a longitudinal direction by the front and rear intake ports 6a, 6b, and thus can be utilized as a design part for improving the appearance around the engine. This can avoid a poor appearance with the running wind introduction duct 17 exposed to the outside, even for so-called "naked" models (models that do not include cowlings around the engine) in which the lateral sides of the engine 6 exposed to the outside.

In this embodiment, the element 19 can be disposed laterally, or generally horizontally, in the air cleaner case 18 to define the inside thereof into the primary chamber A and the secondary chamber B. Additionally, the outside air outlet port 17b of the wind introduction duct 17 can be connected to the primary chamber A located below the element 19. Thus, air having been introduced into the wind introduction duct 17 flows from below the element 19 to above it. This makes it difficult for foreign matters such as paper having entered into the primary chamber A to be drawn toward the lower surface of the element 19. They will easily fall down freely even if they are drawn, preventing clogging in the element 19. In cases where air flows from above the element to below it, for example, foreign matters may remain on the element to cause clogging thereof. In cases where air flows laterally through the element, clogging may be easily caused as well.

In the illustrated embodiment, the primary chamber A can be located below the element 19 and substantially more of the secondary chamber B can be displaced forward from the element 19. This can help accommodate a larger capacity of the secondary chamber B and minimize the height of the air cleaner 16, reducing the constraints on the design of the air cleaner 16. In other words, in cases where the secondary chamber B can be located above the primary chamber A, the height of the entire air cleaner can be accordingly increased. This may cause constraints on the capacity and design of the secondary chamber.

In this embodiment, the outside air introduction ports 17a of the left and right running wind introduction ducts 17 are located on outer sides, in a vehicle width direction, of the left and right fork bodies 5a. This can prevent the front fork 5 from acting as resistance to a wind flowing into the duct 17, thereby enhancing the air intake efficiency.

In this embodiment, the wind introduction duct 17 can be disposed obliquely in such a manner as to lie on an inner side in a vehicle width direction toward the rear of the vehicle. Thus, the wind introduction duct 17 can be connected to, and in communication with, the primary chamber A of the air cleaner 16 at a gentle angle, which reduces the aerodynamic resistance to the flow of intake air, thereby allowing a smoother flow of air.

In this embodiment, the front portion of the wind introduction duct 17 can be arranged in such a manner as to follow the shape of the outside wall surface 3a of the main frame members 3. Thus, the outside wall surface 3a functions as a guide for guiding wind into the wind introduction duct 17. In this way, the outside wall surface 3a of the main frame members 3 can be utilized effectively to enhance the intake efficiency.

In this embodiment, the left and right wind introduction ducts 17 cover from lateral sides the joint members 9 that connect the air cleaner assembly 16 with the respective intake ports 6a, 6b, so as to prevent the joint members 9 from being seen and thus improving the appearance of the vehicle.

According to the intake system of this embodiment, the wind introduction duct 17 includes the resonator 35 having the communication port 35b in communication with the inside of the duct. This also can improve the appearance of the vehicle and can increase installation space, compared to conventional resonators attached externally.

In this embodiment, the running wind introduction duct 17 includes the resonator 35, avoiding problems associated with attaching a resonator externally, such as a poor appearance and securement of an installation space.

Additionally, the narrowing section 34 can be formed in a border area between the front part 32 and the rear part 33 of the wind introduction duct 17. Additionally, the resonance space 35a of the resonator 35 can be formed by effectively utilizing the iris wall 30b constituting the narrowing section 34. Thus, the resonator 35 can be provided by effectively utilizing a dead space formed in the wind introduction duct 17 by the narrowing section 34. This can reduce intake noise while achieving satisfactory appearance and functions of the wind introduction duct 17.

In this embodiment, the narrowing section 34 can be formed on the top wall 30a side of the base member 30 of the wind introduction duct 17, and the branch passage 36a toward the cylinder head can be formed on the bottom wall 30c side of the rear part 33. Thus, water can be drained out through the branch passage 36a together with a part of a wind passing through a passage narrowed by the narrowing section 34 on a lower side of the passage. This can reliably drain out water. The part of the wind emitted through the branch passage 36a cools the cylinder head, improving the cooling performance.

In addition, rainwater or the like having entered into the wind introduction duct 17 hits the iris wall 30b of the narrowing section 34 located on an upper side of the passage, drop down onto the bottom wall 30c, and can then be drained to the outside through the branch passage 36a. In this manner, rainwater can be drained out efficiently and reliably.

In this embodiment, the wind introduction duct 17 can comprise the base member 30 located on an inner side and the cover member 31 located on an outer side. Thus, the wind introduction duct 17 can be fabricated simply by making the members separately and then assembling them together. Another advantage is that the degree of freedom in terms of shape can be enhanced.

In this embodiment, the base member 30 can be made of resin and the cover member 31 can be made of an aluminum alloy. Thus, the narrowing section 34, the resonator 35, and the branch passage 36a can be formed easily by forming the iris wall 30b and the partition wall 30d integrally with the base member 30, and covering it with the cover member 31.

In addition, the wind introduction duct 17 can comprise two parts, namely the base member 30 and the cover member 31. Thus, it is easy to apply a surface treatment to the cover member 31 for improving the appearance of the entire running wind introduction duct 17, even for models with the engine 6 exposed to the lateral outside.

According to the intake system of this embodiment, the front bottom 21b of the secondary chamber B of the air cleaner 16 can be formed with the cylindrical bosses 21f extending in a vertical direction, the joint member 9 can be mounted and fitted in the boss 21f, and the joint member 9 and the boss 21f are formed with the pairs of drain holes 9g, 21g and 9h, 21h, respectively, passing through in radial directions. Thus, drainage accumulated at the front bottom 21b can be sucked directly into the intake ports 6a, 6b through the drain holes 9g, 21g and 9h, 21h. This allows efficient drainage disposal with a simple structure, compared to conventional approaches using a communication pipe.

In this embodiment, the front bottom 21b of the air cleaner 16 can be formed with the interference avoidance sections 42a-42e to avoid interference with in-vehicle components. Thus, it is possible to lower the front bottom 21b while avoiding interference with various in-vehicle components, and increase the capacity of the clean (secondary) side of the air cleaner 16 without increasing the height thereof.

In addition, the front bottom 21b can also be formed with the swelling sections 43 swelling relatively downward with respect to the interference avoidance sections 42a-42e, and the drain holes 9g, 21g and 9h, 21h are located in positions corresponding to the swelling sections 43. Thus, drainage accumulated at the front bottom 21b can be easily collected at the swelling sections 43 for further efficient drainage disposal.

In this embodiment, the boss 21f can be formed with the slits 21i, 21j extending in continuation to the drain holes 21g, 21h to an upper end thereof, the joint member 9 can be formed with the positioning projections 9i, 9j for engagement with the slits 21i, 21j, and when the positioning projections 9i, 9j are in engagement with the slits 21i, 21j, the drain holes 21g, 21h of the boss 21f correspond to the drain holes 9g, 9h of the joint member 9, respectively. Thus, simply inserting and fitting the joint member 9 into the boss 21f allows the drain holes 9g, 21g and 9h, 21h of the two members to be positioned with respect to each other, so as to facilitate their assembly work.

In this embodiment, when the positioning projections 9i, 9j of the joint member 9 are in engagement with the slits 21i, 21j, the fastening bolt 39a of the fixing band 39 can be directed to a prescribed direction for fastening. Thus, simply inserting and fixing the joint member 9 into the boss 21f can make the fastening work of the fixing band 39 easy.

As used herein, the phrase "include a resonator" is intended to refer to the inclusion of, for example, a resonator in a wind introduction duct, and is intended to encompass designs where the resonator is integral with the running wind introduction duct, and cases where they are separate from each other.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine comprising an intake port, an air cleaner in communication with the intake port, the air cleaner having a primary chamber, a wind introduction duct for guiding a wind generated by forward movement of the engine into the primary chamber, the wind introduction duct including an outside wall having a substantially straight shape and a resonator extending from the substantially straight wall into the wind introduction duct, the resonator being configured to absorb predetermined frequencies, the resonator having a predetermined capacity and a communication port in communication with an inside of the introduction duct.

2. The engine of claim 1, wherein the resonator comprises an outside wall of the wind introduction duct and a dividing wall provided in the duct.

3. The engine of claim 2, wherein the wind introduction duct includes a front portion and a rear portion with a passage area smaller than the front portion, a narrowing section arranged so as to narrow a passage area formed in a border area between the front portion and the rear portion, the narrowing section comprising a part of the resonator.

4. The engine of claim 1, wherein the wind introduction duct includes a front portion and a rear portion with a passage area smaller than the front portion, a narrowing section arranged so as to narrow a passage area formed in a border area between the front portion and the rear portion, the narrowing section comprising a part of the resonator.

5. The engine of claim 4, wherein the narrowing section is provided on a top wall side of the wind introduction duct, and an opening toward an outside is provided on a bottom wall side of the rear portion.

6. The engine of claim 5, wherein a branch passage is formed in the rear portion, the branch passage opening toward a cylinder head of the engine.

7. The engine of claim 1, wherein the communication port is disposed on a wall of the resonator that faces a downstream direction, in the direction of airflow through the wind introduction port during operation of the engine.

8. An engine comprising an intake port, an air cleaner in communication with the intake port, the air cleaner having a primary chamber, a wind introduction duct for guiding a wind generated by forward movement of the engine into the primary chamber, the wind introduction duct including a resonator within the wind introduction duct and that is configured to absorb predetermined frequencies, the resonator having a predetermined capacity and a communication port in communication with an inside of the introduction duct, wherein the wind introduction duct includes a base part located on an inner side in a vehicle width direction and a cover part made of a material different from that of the base part and disposed in such a manner as to cover the base part from an outer side of the engine, and the cover part is applied with a surface treatment for improving an appearance.

9. The engine of claim 8 in combination with a vehicle.

10. The engine of claim 8, wherein a connection portion to the air cleaner is formed in the base part, and the cover part covers the connection portion from an outer side of the engine.

11. The engine of claim 10 in combination with a vehicle.

12. An engine comprising an intake port, an air cleaner in communication with the intake port, the air cleaner having a primary chamber, a wind introduction duct for guiding a wind generated by forward movement of the engine into the primary chamber, the wind introduction duct including a resonator within the wind introduction duct and that is configured to absorb predetermined frequencies, the resonator having a predetermined capacity and a communication port in communication with an inside of the introduction duct, wherein the resonator comprises an outside wall of the wind introduction duct and a dividing wall provided in the duct wherein the wind introduction duct includes a base part located on an inner side in a vehicle width direction and a cover part made of a material different from that of the base part and disposed in such a manner as to cover the base part from an outer side of the engine, and the cover part is applied with a surface treatment for improving an appearance.

13. An engine comprising an intake port, an air cleaner in communication with the intake port, the air cleaner having a primary chamber, a wind introduction duct for guiding a wind generated by forward movement of the engine into the primary chamber, the wind introduction duct including a resonator within the wind introduction duct and that is configured to absorb predetermined frequencies, the resonator having a predetermined capacity and a communication port in communication with an inside of the introduction duct, wherein the wind introduction duct includes a front portion and a rear portion with a passage area smaller than the front portion, a narrowing section arranged so as to narrow a passage area formed in a border area between the front portion and the rear portion, the narrowing section comprising a part of the resonator, and wherein the wind introduction duct includes a base part located on an inner side in a vehicle width direction and a cover part made of a material different from that of the base part and disposed in such a manner as to cover the base part from an outer side of the engine, and the cover part is applied with a surface treatment for improving an appearance.

\* \* \* \* \*